United States Patent
Hunter et al.

(10) Patent No.: US 11,960,299 B2
(45) Date of Patent: Apr. 16, 2024

(54) SYSTEM FOR AUTONOMOUS AND SEMI-AUTONOMOUS MATERIAL HANDLING IN AN OUTDOOR YARD

(71) Applicant: Oceaneering International, Inc., Houston, TX (US)

(72) Inventors: Alexander Hunter, Baltimore, MD (US); Marc Brooks, Baltimore, MD (US); David Pietrocola, Baltimore, MD (US); Siddharth Srivatsa, Baltimore, MD (US)

(73) Assignee: Oceaneering International, Inc., Houston, TX (US)

( * ) Notice: Subject to any disclaimer, the term of this patent is extended or adjusted under 35 U.S.C. 154(b) by 281 days.

(21) Appl. No.: 17/336,528

(22) Filed: Jun. 2, 2021

(65) Prior Publication Data
US 2021/0373572 A1 Dec. 2, 2021

Related U.S. Application Data

(60) Provisional application No. 63/033,550, filed on Jun. 2, 2020.

(51) Int. Cl.
*G05D 1/02* (2020.01)
*B60L 53/36* (2019.01)
(Continued)

(52) U.S. Cl.
CPC ............ *G05D 1/0278* (2013.01); *B60L 53/36* (2019.02); *G01S 1/72* (2013.01); *G01W 1/02* (2013.01);
(Continued)

(58) Field of Classification Search
CPC .. G05D 1/0278; G05D 1/0214; G05D 1/0225; G05D 2201/0201; G05D 2201/0202; G05D 2201/0205; G05D 2201/0216; G05D 1/024; G05D 1/0282; B60L 53/36; B60L 3/0015; B60L 53/66; B60L 2200/42; B60L 2240/622; B60L 2260/32; G01S 1/72; G01W 1/02; G01W 2203/00; B66F 9/063; Y02T 10/70;
(Continued)

(56) References Cited

U.S. PATENT DOCUMENTS

2012/0109437 A1\* 5/2012 Iwase .................. H01M 10/484
701/22
2015/0250137 A1\* 9/2015 Palsgaard ............ A01K 5/0266
119/57.92

(Continued)

*Primary Examiner* — Rodney A Butler
(74) *Attorney, Agent, or Firm* — Maze IP Law, P.C.

(57) ABSTRACT

A flexible material handling system for can handle varied loads and placements including operation in varying weather conditions, and integrates safety systems to tolerate pedestrians and manual vehicles in an operating environment. An autonomous vehicle is operable along a vehicle traversal path within a predetermined set of environmental conditions. A GPS base station is operatively in communication with the autonomous vehicle. A supervisor/orchestrator is operatively in communication with the autonomous vehicle and the GPS base station and is operative to coordinate movement of the autonomous vehicle along the vehicle traversal path and assign one or more tasks for the autonomous vehicle to accomplish.

20 Claims, 2 Drawing Sheets

(51) Int. Cl.
*G01S 1/72* (2006.01)
*G01W 1/02* (2006.01)
*G05D 1/00* (2006.01)
*B66F 9/06* (2006.01)

(52) U.S. Cl.
CPC ......... *G05D 1/0214* (2013.01); *G05D 1/0225* (2013.01); *B66F 9/063* (2013.01); *G01W 2203/00* (2013.01); *G05D 2201/0201* (2013.01); *G05D 2201/0202* (2013.01); *G05D 2201/0205* (2013.01); *G05D 2201/0216* (2013.01)

(58) Field of Classification Search
CPC ..... Y02T 10/7072; Y02T 90/16; Y02T 10/72; Y02T 90/12; Y02P 90/60
See application file for complete search history.

(56) References Cited

U.S. PATENT DOCUMENTS

| | | | | |
|---|---|---|---|---|
| 2020/0310424 | A1* | 10/2020 | Schmidt | G07C 5/0825 |
| 2020/0326699 | A1* | 10/2020 | Bastian, II | B66F 17/003 |
| 2021/0001473 | A1* | 1/2021 | DeWind | B25H 1/08 |
| 2022/0111522 | A1* | 4/2022 | Ko | B25J 9/1676 |

* cited by examiner

SYSTEM FOR AUTONOMOUS AND SEMI-AUTONOMOUS MATERIAL HANDLING IN AN OUTDOOR YARD

RELATION TO OTHER APPLICATIONS

This application claims priority through U.S. Provisional Application 63/033,550 filed on Jun. 2, 2020.

BACKGROUND

Systems for autonomous and semi-autonomous material handling in a facility which comprises an outdoor yard suffer from labor availability, process efficiency and accuracy, and product damage. There is a need for an automated material handling system using a forklift or pallet lift type vehicle where manual forklifts have been typically used, e.g., for material handling processes such as production area/conveyor to outdoor inventory/staging yard; order picking from yard/staging and unloading on flatbed trailer; manufacturing processing moving from one building to another through outdoors; and the like.

Current solutions that have been sold/deployed rely on extensive navigation infrastructure (e.g., magnets in a floor or other drive surface) and are not flexible nor can they handle varied loads and placements. Further, operation in all-weather conditions is not always possible. Moreover, current solutions do not typically integrate different safety systems to tolerate pedestrians and manual vehicles in an operating environment, particularly in rows of product aisles, where line of sight of a safety scanner would not be sufficient to avoid collisions when traveling at high speeds.

FIGURES

Various figures are included herein which illustrate aspects of embodiments of the disclosed inventions.

Figure 1:
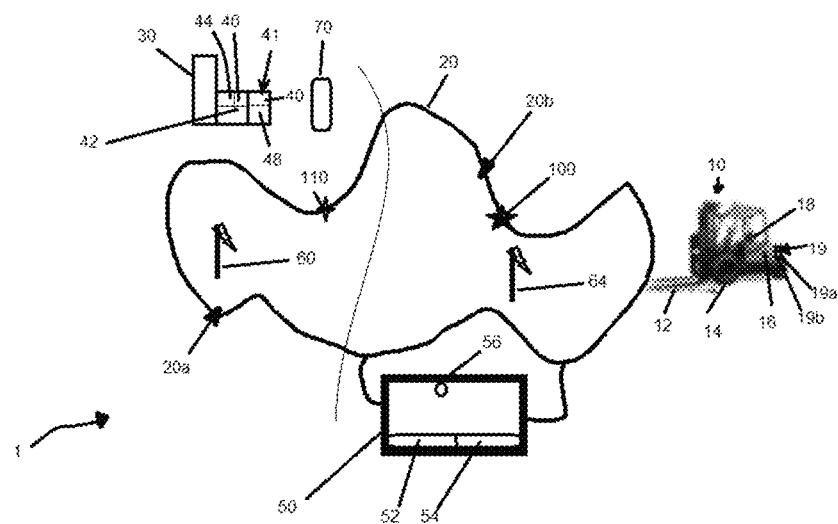
Figure 2:
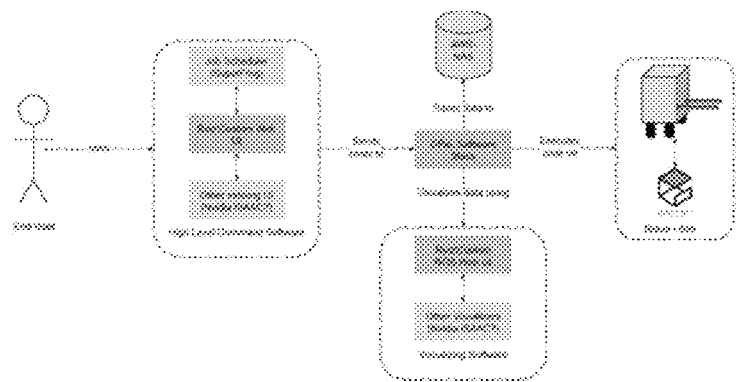
Figure 3:
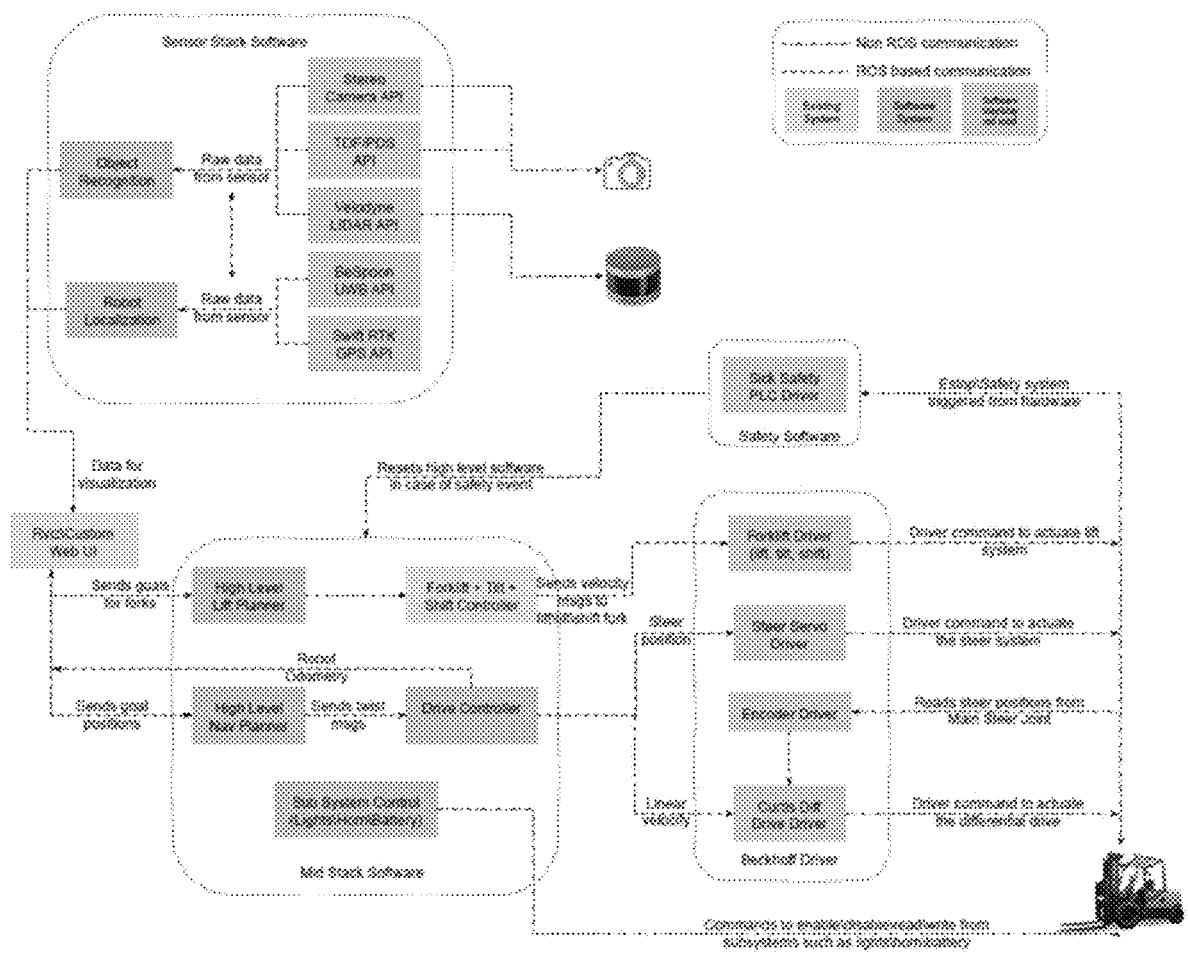

FIG. 1 is a schematic overview of an exemplary system;
FIG. 2 is a schematic overview of an exemplary system; and
FIG. 3 is a schematic overview of an exemplary system modules.

DESCRIPTION OF EXEMPLARY EMBODIMENTS

In a first embodiment, referring generally to FIG. 1, system 1 for material handling in an area comprises vehicle traversal path 20 disposed at least partially within a facility; autonomous vehicle 10 operable along vehicle traversal path 20 within a predetermined set of environmental conditions, either automatically or with optional human assistance or a combination thereof; GPS base station 30 operatively in communication with autonomous vehicle 10; and supervisor/orchestrator 40 located proximate to or within vehicle traversal path 20 and operatively in communication with autonomous vehicle 10, GPS base station 30, external device 70 if present, or the like, or a combination thereof.

Autonomous vehicle 10 typically comprises controllably automatable forklift 12 which is operable over a predetermined variable set of load configurations; vehicle mover 14, which can comprise a motor and a steering system; autonomous navigator 16, which typically comprises a central processing unit (CPU) and associated memory and one or more data stores, operably in communication with vehicle mover 14; obstacle avoidance system 18, which may comprise a central processing unit (CPU) and associated memory and one or more data stores, operatively in communication with autonomous navigator 16 where obstacle avoidance system 18 is configured to detect one or more obstacles 100,110 present along vehicle traversal path 20; and power system 19 operatively in communication with automatable forklift 12, vehicle mover 14, autonomous navigator 16, and obstacle avoidance system 18. Obstacles 100,110 can be animate and/or inanimate objects.

In embodiments, vehicle mover 14 comprises a predetermined set of counterbalanced, pneumatic tires for outdoor terrain and autonomous vehicle 10 may further have a maximum load at least 6,000 lb.

Controllably automatable forklift 12 typically comprises a predetermined set of forks which can interface with pallet sizes of up to 48 inches by 48 inches or with double-wide pallets.

Autonomous vehicle 10 may comprise an autonomous mobile robot (AMR), including a manually drivable AMR, and, in such embodiments, vehicle traversal path 10 typically comprises a dynamic vehicle path and obstacle avoidance system 18 further comprises logic to navigate the AMR around a detected obstacle.

In other embodiments, autonomous vehicle 10 comprises an automated guided vehicle (AGV) and vehicle traversal path 20 typically comprises a static vehicle path. In such embodiments, obstacle avoidance system 18 further comprises logic to halt progression of the AGV along vehicle traversal path 20 if obstacle 100,110 is determined to be at least partially within or otherwise occluding the static vehicle path until obstacle 100,110 moves or is removed.

Power system 19 is typically a rechargeable power system. In such embodiments, rechargeable power system 19 comprises one or more rechargeable power stores 19a and one or more power recharge interfaces 19b operatively in communication with rechargeable power store 19a.

In an embodiment, vehicle traversal path 20 is disposed around or within enclosed area 20a, open area 20b, or a combination of closed area 20b and open area 20a. For open areas 20a, the predetermined set of environmental conditions may comprise outdoor weather conditions. Areas 20a, 20b may comprise an outdoor area used for inventory, distribution, and staging; an area used for cargo; a construction site; an agricultural distribution site; a manufacturing facility; or the like; or a combination thereof.

Supervisor/orchestrator 40 is typically located within the facility and will be in communication with the forklift operative to coordinate movement of autonomous vehicle 10 along vehicle traversal path 20 and to assign one or more tasks for autonomous vehicle 10 to accomplish such as path traversal, forklift movement, and the like. In embodiments, this assumes a dynamic vehicle path, wherein autonomous vehicle 10 is allowed to deviate from a specified path in case of an exception, e.g., where co-ordination of movement will involve going around obstacles 100/110, waiting if obstacle 100/110 is too close, waiting at a stop sign or other designated wait area, coordinating movement with other autonomous vehicles 10, or the like, or a combination thereof.

To do so, supervisor/orchestrator 40 is typically in communication with autonomous vehicle 10. Supervisor/orchestrator 40 may comprise OASYS SuperFROG software and is typically resident and operative server 41, which typically comprises a central processing unit (CPU) and associated memory and one or more data stores, located proximate to or within vehicle traversal path 20.

External device 70 may comprise a remote input/output (RIO) box, a weather station, a yard management system, or the like or a combination thereof. The RIO box may be one or more OASYS RIO Boxes disposed proximate or on bay doors requiring automatic open/close from vehicles, where OASYS comprises an ORange SYnchrotron Suite which can interface with a "RIO Box" which acts as an interface between autonomous vehicle 10 and the platform.

Obstacles 100,110 may comprise non-automated traffic such as vehicles or forklifts, barriers such as structures, living beings, or the like, or a combination thereof.

In embodiments, system 1 may further comprise remote real-time and asynchronous data logging system 42, system monitoring system 44, system auditor 46, material handling operations support 48 which may further provide data insight to a customer, or the like or a combination thereof. These may be independent of each other or integrated with each and may be part of supervisor/orchestrator 40 or separate components. In embodiments, remote real-time and asynchronous data logging system 42 is a software module located on or in autonomous vehicle 10 itself and is operative to log information obtained from forklift 12 into electronic files in or accessible to autonomous navigator 16 where these files can be retrieved from supervisor/orchestrator 40.

In embodiments, system monitoring system 44, is a software module located on or in autonomous vehicle 10 itself and is operative to monitor critical components of autonomous vehicle 10 and is operatively in communication with supervisor/orchestrator 40.

In embodiments, system auditor 46 is a software module or system operative to track inventory, cycling of materials/goods in stock, cross referencing purchase orders, cycle counting, and the like, or a combination thereof and is part of or otherwise integrated with supervisor/orchestrator 40.

In embodiments, material handling operations support may further provide data insight to customer 48 such as transport time per cycle of moving product, insights regarding routes/stoppage times and locations along routes, maintaining throughput of moving product, and the like, or a combination thereof.

In certain embodiments, maintenance shed 50 may be present and configured to protect autonomous vehicle 10 from environment elements when autonomous vehicle 10 is not in use, e.g., designed to house autonomous vehicle 10 therein. Maintenance shed 50 may comprise one or more battery chargers 52 operative to interface with power recharge interface 19b and provide recharge power to rechargeable power system 19; autonomous vehicle automatic docking system 54 operative to will position autonomous vehicle 10 automatically, navigate autonomous vehicle 10 inside maintenance shed 50, and connect autonomous vehicle 10 to the battery charger 52; and predetermined set of shed sensors 56 operatively in communication with autonomous vehicle automatic docking system 54. Shed sensors 56 may comprise one or more cameras and other sensors such as Lidars, Depth Cameras, and/or Time of Flight Sensors to aid in performing a predetermined function such as running a diagnostic, supporting remote help, or the like, or a combination thereof. The diagnostics may regard health of battery, charge/discharge cycles, and the like, and combinations thereof, and may be split to run on battery charger 52 and autonomous vehicle 10. Other diagnostics may include such as sensor checks, ensuring all components are operational, identifying network dropout zones, and the like, or a combination thereof. Remote help typically comprises extracting log files and/or diagnostics from autonomous vehicle 10, manually guiding autonomous vehicle 10 into maintenance shed 50, debugging systems which are not functioning as expected, and the like, and/or combinations thereof.

In embodiments, system 1 may further comprise one or more ultra-wideband anchors 60 which may be installed in a fixed location in a facility comprising areas 20a and/or 20b such as a location in areas 20a and/or 20b where a GPS signal is weak. As used herein, an ultra-wideband anchor may be similar to an antenna that is installed on walls or other fixed locations and used to compute the precise locations of Ultra-wide band tags.

Where system 1 comprises external device 70 that further comprises a weather station, the weather station may be operative to provide a current state of an operating environment element and be operational to help effect a change in operation of autonomous vehicle 10 based on the current state of an operating environment element such as a weather condition.

In the operation of exemplary embodiments, load movement using a system for material handling in areas 20a,20b using system 1 as described herein comprises deploying system 1 for material handling in areas 20a,20b; identifying a load position in areas 20a,20b of a load to be retrieved by autonomous vehicle 10; using GPS Base station 30 to issue one or more commands to autonomous vehicle 10 to travel along traversal path 10 from the then current position of autonomous vehicle 10 to the load position; and using autonomous navigator 16 to scan traversal path 20 when autonomous vehicle 10 is traveling along traversal path 20 and to detect one or more obstacles 100,110 present along traversal path 20. If obstacle 100,110 is detected by autonomous navigator 16, obstacle avoidance system 18 issues one or more commands to autonomous vehicle 10 to take an obstacle avoidance action.

Once autonomous vehicle 10 reaches the load location, using supervisor/orchestrator 40 to issue one or more commands to autonomous vehicle 10 to engage the load with forklift 12. This may include, once autonomous vehicle 10 reaches a load location, using supervisor/orchestrator 40 to issue one or more commands to autonomous vehicle 10 to engage the load with the forks such as by locating an exact position of load, aligning controllably automatable forklift 12 with the load, driving autonomous vehicle 10 up to the load, engaging controllably automatable forklift 12 with the load, backing autonomous vehicle 10 away from the load location, and driving autonomous vehicle 10 to a drop off location.

If areas 20a,20b comprise an area used for cargo, engaging may further comprise interfacing with and moving ULDs unit load device. If areas 20a,20b comprise a construction site, engaging may comprises moving material from delivery trucks to points of use.

Where system 1 further comprises maintenance shed 50, the method typically further comprises navigating autonomous vehicle 10 to maintenance shed 50 from the then current location of autonomous vehicle in areas 20a,20b as and if needed. This typically occurs using one or more commands issued by GPS Base station 30 upon detection of an environmental condition in the area by the GPS Base station to autonomous navigator 18 upon detection of an environmental condition or from detection of a condition of autonomous vehicle 10 in areas 20a,20b by autonomous navigator 18 and/or external device 70.

In embodiments where maintenance shed 50 is present and comprises a battery charger operative to interface with autonomous vehicle recharge interface 19b and provide recharge power to power system 19 and an autonomous vehicle automatic docking system, detection of a condition of autonomous vehicle 10 typically comprises detecting a power level condition of rechargeable power system 19 and navigating autonomous vehicle 10 to maintenance shed 50 from the then current location of autonomous vehicle 10 in areas 20a,20b further comprises navigating autonomous vehicle 10 to maintenance shed 50, docking autonomous vehicle 10 with autonomous vehicle automatic docking system 54, operatively connecting the battery charger to autonomous vehicle recharge interface 19b, and using the battery charger to provide recharge power to the rechargeable power store 19a.

In embodiments, system 1 comprises an ultra-wideband anchor UWB installed in a fixed location in areas 20a,20b. In such embodiments, the UWB may be used to track personnel and manual vehicles in area 10a,20b provide an extra layer of safety for autonomous vehicle 10 to stop/pause motion in case of personnel/manual vehicles in its vicinity.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A system for material handling in an area, comprising:
   a. a vehicle traversal path;
   b. an autonomous vehicle, comprising:
      i. a controllably automatable forklift operable over a predetermined variable set of load configurations;
      ii. a vehicle mover;
      iii. an autonomous navigator operably in communication with the vehicle mover and operative to automatically navigate the autonomous vehicle along the vehicle traversal path within a predetermined set of environmental conditions;
      iv. an obstacle avoidance system operatively in communication with the autonomous navigator, the obstacle avoidance system configured to detect an obstacle present along the vehicle traversal path; and
      v. a rechargeable power system operatively in communication with the automatable forklift, the vehicle mover, the autonomous navigator, and the obstacle avoidance system, the rechargeable power system comprising:
         1. A rechargeable power store;
         2. A power recharge interface operatively in communication with the rechargeable power store;
   c. a GPS base station operatively in communication with the automatable forklift; and
   d. a supervisor/orchestrator located proximate to or within vehicle traversal path and operatively in communication with the automatable forklift, the GPS base station, and an external device, the supervisor/orchestrator operative to:
      i. coordinate movement of the autonomous vehicle along the vehicle traversal path; and
      ii. assign a task for the autonomous vehicle to accomplish.

2. The system for material handling in an area of claim 1, wherein:
   a. the vehicle traversal path is disposed within a closed area, an open area, and a combination of a closed area and an open area; and
   b. for open areas, the predetermined set of environmental conditions comprise outdoor weather conditions.

3. The system for material handling in an area of claim 1, wherein the external device comprises a remote input/output (RIO) box, a weather station, or a yard management system.

4. The system for material handling in an area of claim 1, wherein:
   a. the autonomous vehicle comprises an autonomous mobile robot (AMR);
   b. the vehicle traversal path comprises a dynamic vehicle path; and
   c. the obstacle avoidance system further comprises logic to navigate the AMR around a determined obstacle.

5. The system for material handling in an area of claim 4, wherein the AMR comprises a manually drivable AMR.

6. The system for material handling in an area of claim 1, wherein:
   a. the autonomous vehicle comprises an automated guided vehicle (AGV);
   b. the vehicle traversal path comprises a static vehicle path; and
   c. the obstacle avoidance system further comprises logic to halt progression of the AGV along the vehicle traversal path if an obstacle is determined to be at least partially within the static vehicle path until the obstacle is removed.

7. The system for material handling in an area of claim 1, further comprising:
   a. a remote real-time and asynchronous data logging system operative in the autonomous vehicle;
   b. a system monitoring system operative in the autonomous vehicle and operatively in communication with the supervisor/orchestrator;
   c. a system auditor; and
   d. material handling operations support.

8. The system for material handling in an area of claim 1, further comprising a maintenance shed configured to protect the autonomous vehicle from environment elements when the autonomous vehicle is not in use.

9. The system for material handling in an area of claim 8, wherein the maintenance shed further comprises:
   a. a battery charger operative to interface with the power recharge interface and provide recharge power to the rechargeable power system;
   b. an autonomous vehicle automatic docking system operative to position the autonomous vehicle automatically and navigate the autonomous vehicle inside the maintenance shed and connect the autonomous vehicle to the battery charger; and
   c. a predetermined set of sensors.

10. The system for material handling in an area of claim 1, further comprising an ultra-wideband anchor installed in a fixed location in the area.

11. The system for material handling in an area of claim 10, wherein the autonomous vehicle is further operable to traverse the vehicle traversal path within a predetermined set of environmental conditions with human assistance.

12. The system for material handling in an area of claim 1, further comprising a weather station operative to provide a current state of an operating environment element which can be operational to effect a change in operation of the autonomous vehicle based on a weather condition, the weather station operatively in communication with the supervisor/orchestrator.

13. The system for material handling in an area of claim 1, wherein the controllably automatable forklift comprises a predetermined set of forks which can interface with pallet sizes of up to 48 inches by 48 inches or with double-wide pallets.

14. A method of load movement using a system for material handling in an area, the system for material handling in an area comprising a vehicle traversal path; an autonomous vehicle, comprising a controllably automatable forklift operable over a predetermined variable set of load configurations, a vehicle mover, an autonomous navigator operably in communication with the vehicle mover and operative to automatically navigate the autonomous vehicle along the vehicle traversal path within a predetermined set of environmental conditions, an obstacle avoidance system operatively in communication with the autonomous navigator where the obstacle avoidance system is configured to detect an obstacle present along the vehicle traversal path, and a rechargeable power system operatively in communication with the automatable forklift, the vehicle mover, the autonomous navigator, and the obstacle avoidance system where the rechargeable power system comprises a rechargeable power store, a power recharge interface operatively in communication with the rechargeable power store, a GPS base station operatively in communication with the automatable forklift, and a supervisor/orchestrator located proximate to or within vehicle traversal path and operatively in communication with the automatable forklift, the GPS Base station, and an external device where the supervisor/orchestrator is operative to coordinate movement of the autonomous vehicle along the vehicle traversal path and assign a task for the autonomous vehicle to accomplish, the method comprising:
 a. deploying the system for material handling in an area;
 b. identifying a load position in the area of a load to be retrieved by the autonomous vehicle;
 c. using the GPS base station to command the autonomous vehicle to travel along the traversal path from its then current position to the load position;
 d. using the autonomous navigator to scan the traversal path when the autonomous vehicle is traveling along the traversal path and to detect an obstacle along the traversal path;
 e. if an obstacle is detected by the autonomous navigator, using the obstacle avoidance system to command the autonomous vehicle to take an obstacle avoidance action;
 f. once the autonomous vehicle reaches the load location, issuing a command to command the autonomous vehicle to engage the load with the forklift.

15. The method of load movement using a system for material handling in an area of claim 14, wherein the area comprises an outdoor area used for inventory, distribution, and staging.

16. The method of load movement using a system for material handling in an area of claim 15, wherein the outdoor area comprises:

a. an area used for cargo where engaging comprises interfacing with and moving ULDs (unit load device);
 b. a construction site where engaging comprises moving material from delivery trucks to points of use;
 c. an agricultural distribution site; or
 d. a manufacturing facility.

17. The method of load movement using a system for material handling in an area of claim 14, wherein:
 a. the system further comprises a maintenance shed; and
 b. the method further comprises navigating the autonomous vehicle to the maintenance shed from its then current location in the area.

18. The method of load movement using a system for material handling in an area of claim 17, wherein navigating the autonomous vehicle to the maintenance shed from its then current location in the area is commanded by the GPS Base station upon detection of an environmental condition in the area by the GPS Base station, the autonomous navigator upon detection of an environmental condition in the area by the autonomous navigator, or by the autonomous navigator upon detection of a condition of the autonomous vehicle.

19. The method of load movement using a system for material handling in an area of claim 18, wherein the maintenance shed further comprises a battery charger operative to interface with the autonomous vehicle recharge interface and provide recharge power to the power system and an autonomous vehicle automatic docking system, the method further comprising:
 a. detection of a condition of the autonomous vehicle comprises detecting a power level condition of the rechargeable power system; and
 b. navigating the autonomous vehicle to the maintenance shed from its then current location in the area further comprises:
  i. navigating the autonomous vehicle to the maintenance shed;
  ii. docking the autonomous vehicle with the autonomous vehicle automatic docking system;
  iii. operatively connecting the battery charger to the autonomous vehicle recharge interface; and
  iv. using the battery charger to provide recharge power to the rechargeable power store.

20. The method of load movement using a system for material handling in an area of claim 14, wherein:
 a. the system further comprises an ultra-wideband anchor (UWB) installed in a fixed location in the area; and
 b. the method further comprises using the UWB to track personnel and manual vehicles in the area.

\* \* \* \* \*